United States Patent
Ayirala et al.

(10) Patent No.: US 11,214,730 B1
(45) Date of Patent: Jan. 4, 2022

(54) LOW PH-BASED OIL RECOVERY METHOD FOR CARBONATE RESERVOIRS

(71) Applicant: Saudi Arabian Oil Company, Dhahran (SA)

(72) Inventors: Subhash Chandrabose Ayirala, Dhahran (SA); Moataz Abu AlSaud, Dhahran (SA); Ali Yousef, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/015,946

(22) Filed: Sep. 9, 2020

(51) Int. Cl.
| | |
|---|---|
| *E21B 43/16* | (2006.01) |
| *E21B 43/27* | (2006.01) |
| *C09K 8/74* | (2006.01) |
| *E21B 43/26* | (2006.01) |

(52) U.S. Cl.
CPC ............. *C09K 8/74* (2013.01); *E21B 43/16* (2013.01); *E21B 43/26* (2013.01); *E21B 43/27* (2020.05)

(58) Field of Classification Search
CPC ............ C09K 8/74; E21B 43/26; E21B 43/16
See application file for complete search history.

(56) References Cited

U.S. PATENT DOCUMENTS

| | | | | |
|---|---|---|---|---|
| 2007/0246426 | A1* | 10/2007 | Collins ................. | C09K 8/528 210/651 |
| 2010/0230106 | A1* | 9/2010 | Milne ................... | C09K 8/588 166/307 |
| 2012/0018161 | A1* | 1/2012 | Al-Yousef ............. | E21B 43/20 166/305.1 |
| 2012/0125604 | A1 | 5/2012 | Willingham et al. | |
| 2014/0338903 | A1 | 11/2014 | Mahmoud et al. | |
| 2017/0081583 | A1* | 3/2017 | Han ...................... | C09K 8/588 |
| 2017/0137700 | A1* | 5/2017 | Prakash ................ | C09K 8/605 |

OTHER PUBLICATIONS

Alkandari et al., "Technical Advancement of Carbonate Acid Stimulation Injection," presented at the SPE Kuwait Oil & Gas Conference and Show held in Mishref, Kuwait, Society of Petroleum Engineers, SPE-197982-MS, Oct. 13-16, 2019, 22 pages.
Qureshi et al., "The Interpretation of Permeability Changes during Acid Injection in Carbonates: A New Integrated Methodology," presented at the Abu Dhabi International Petroleum Exhibition and Conference held in Abu Dhabi, UAE, Society of Petroleum Engineers, SPE-177609-MS, Nov. 9-12, 2015, 8 pages.
Thomas et al., "Alkali and Hybrid-Alkali Flooding as a Tertiary Oil Recovery Mode: Prospects and Challenges," International Journal of Petroleum and Petrochemical Engineering, 2(2), 2016, 22-31, 10 pages.

* cited by examiner

*Primary Examiner* — Silvana C Runyan
(74) *Attorney, Agent, or Firm* — Fish & Richardson P.C.

(57) ABSTRACT

A method for enhancing oil recovery in carbonate reservoirs using low pH solutions for wettability alteration.

21 Claims, 2 Drawing Sheets

US 11,214,730 B1

LOW PH-BASED OIL RECOVERY METHOD FOR CARBONATE RESERVOIRS

TECHNICAL FIELD

This document relates to a method for enhancing oil recovery in carbonate reservoirs using low pH solutions for wettability alteration.

BACKGROUND

As oil and gas reservoirs mature during production, it becomes increasingly difficult to recover the residual hydrocarbons that still remain. This can be due to several factors, including that the reservoirs have low porosity and the reservoir rock is oil-wet. Consequently, when oil and gas flow towards the wellbore to the surface, there is diminished flow of the oil and gas. The oil-wet and reduced porosity conditions can also reduce productivity when enhanced oil recovery (EOR) techniques are employed, such that the injected EOR fluids will bypass the oil that resides in the rock matrix. As a result of the reduced porosity and oil-wet conditions, the productivity of the well is reduced during conventional, primary or secondary production of hydrocarbon fluids.

By changing the wettability of the formation from oil-wet to water-wet, it may be possible to increase oil recovery. Treatment fluids for changing the wettability that include chemicals have been proposed. However, conditions in the reservoir are harsh and unreceptive to chemical manipulations. Moreover, permeability and porosity of the well should be preserved or enhanced with any proposed treatment. Other conventional waterflooding processes for enhanced oil recovery in carbonates rely on injection of high salinity water with high (alkaline) pH. The oil recovery from these methods is often not optimum due to the unfavorable wetting conditions.

Low pH applications, such as carbonate fracturing and matrix acidizing, are mainly used for well stimulation and to increase the productivity. However, these wellbore stimulation treatments include using strong acids such as HCl, which can be corrosive.

There remains a need for well treatment methods that can enhance the recovery of oil from existing oil reservoirs, while avoiding harmful effects on the recovery efficiency of the formation. Thus, there is a need for a process for enhancing oil recovery that alters the wettability of a carbonate reservoir to release more oil from carbonate rock surfaces. There is also a need for a process that utilizes low pH acidic solutions rather than corrosive and damaging high pH alkaline solutions.

SUMMARY

Provided in this disclosure is a method for enhancing oil recovery from a carbonate reservoir. In some embodiments, the method includes: injecting a first slug comprising low pH high salinity water into the reservoir, where the water has a pH of about 3 to about 5; and injecting a second slug comprising chase water into the reservoir, where the chase water comprises high salinity brine.

In some embodiments of the method, the low pH high salinity water comprises about 35,000 ppm to about 60,000 ppm total dissolved solids (TDS). In some embodiments, the low pH high salinity water comprises a weak acid. In some embodiments, the weak acid is selected from citric acid, formic acid, and acetic acid.

In some embodiments of the method, the first slug has a slug size of from 0.3 pore volumes to 0.5 pore volumes. In some embodiments, the first slug is injected one time, two times, three times, or more. In some embodiments, the first slug is injected more than one time, where each injection comprises water with increasing pH value as compared to the previous injection.

In some embodiments of the method, the high salinity brine comprises about 35,000 ppm to about 60,000 ppm total dissolved solids (TDS). In some embodiments, the high salinity brine has a pH of from about 6 to about 8.

In some embodiments of the method, the second slug has a slug size of from 0.5 pore volumes to 1.0 pore volumes. In some embodiments, injecting the second slug into the carbonate reservoir comprises continuously injecting the second slug at a continuous rate.

In some embodiments of the method, the chase water is injected after the low pH high salinity water is injected.

In some embodiments, the method includes recovering displaced oil from the carbonate reservoir. In some embodiments, injecting the low pH high salinity water into the reservoir renders the surface of the reservoir water wet, thereby facilitating the removal of oil from the surface of the reservoir.

Also provided in the present disclosure is a method of facilitating the removal of oil from a carbonate reservoir. In some embodiments, the method includes: injecting a first slug comprising low pH high salinity water into the reservoir, where the water has a pH of about 3 to about 5; injecting a second slug comprising chase water into the reservoir, where the chase water comprises high salinity brine; and displacing the oil from the surface of the carbonate reservoir. In some embodiments, the method includes recovering the displaced oil from the carbonate reservoir.

In some embodiments of the method, the low pH high salinity water comprises about 35,000 ppm to about 60,000 ppm total dissolved solids (TDS). In some embodiments, the low pH high salinity water comprises a weak acid.

In some embodiments of the method, the first slug has a slug size of from 0.3 pore volumes to 0.5 pore volumes.

In some embodiments of the method, the high salinity brine comprises about 35,000 ppm to about 60,000 ppm total dissolved solids (TDS). In some embodiments, the high salinity brine has a pH of from about 6 to about 8.

In some embodiments of the method, the second slug has a slug size of from 0.5 pore volumes to 1.0 pore volumes.

In some embodiments of the method, the chase water is injected after the low pH high salinity water is injected.

DETAILED DESCRIPTION

Figure 1:
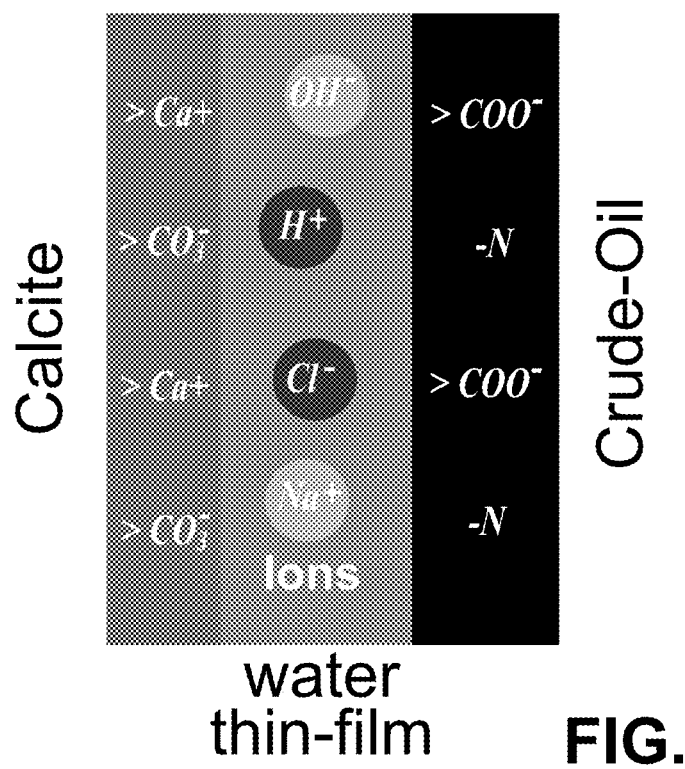
FIG. 1 shows the different ions inside a thin-film water layer squeezed between a calcite surface and a crude oil surface.

"Wettability" refers to the adhesion tension, or the tendency of a particular fluid to spread on or adhere to a solid surface in the presence of another immiscible fluid. "Formation wettability" refers particularly to the ability of a rock surface to preferentially contact a particular fluid and is a function of the solid-liquid-liquid interfacial tension and determines which fluid (oil or water) will preferentially wet, or adhere to, the surface of the rock. When the adhesion tension is large, the denser liquid readily spreads out and coats the surface of the rock, whereas when the adhesion tension is small, the denser fluid will only be weakly attracted to the surface. The formation wettability can affect the formation's properties, including, but not limited to, fluid flow and residual oil distribution. Under oil-wet conditions, oil tends to be retained by the rock, resulting in low mobility of the oil, and consequently, poor recovery of the oil from the formation. Carbonate rocks tend to be more oil-wet in many cases and mixed-wet in some cases. Changing the character of the rock from oil-wet to more water-wet will allow oil to flow more freely instead of being bound to the rock surface. Thus, it is desirable to enhance wettability alteration in order to obtain improved recovery from rock systems.

The present disclosure provides an improved oil recovery method for carbonate formations based on the injection of low pH solutions into the reservoir. In some embodiments, the method involves the injection of weak acid solutions at pH conditions ranging from about 3 to about 5 with a slug size in between 0.3 to 0.5 pore volumes. The low pH slug is then chased with a continuous seawater injection. Without wishing to be bound by any particular theory, the low pH conditions arising from the finite slug are thought to alter the surface charges of the carbonate/brine and crude oil/brine interfaces in the reservoir towards more positive values. This favorable surface charge alteration increases the repulsive forces between the two interfaces and stabilizes the water film on the carbonate surface to develop water-wet conditions. Such beneficial wettability modification causes the detachment of crude oil from the carbonate surface, which will eventually be mobilized and pushed towards the producing wells by the chase seawater.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Definitions

In this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about" as used herein can allow for a degree of variability in a value or range, for example, within 10%, within 5%, or within 1% of a stated value or of a stated limit of a range.

A "carbonate reservoir" or "carbonate formation" is a formation that is mainly comprised of calcium carbonate ($CaCO_3$), calcium magnesium carbonate ($CaMg(CO_3)_2$), or any combination thereof.

"Zeta potential" is a parameter characterizing electrochemical equilibrium on interfaces, where the zeta potential depends on the properties of the liquid as well as on properties of the surface. It is widely used to quantify the polarity and magnitude of surface charge at the interface. Zeta potential can be calculated from electrophoretic mobility measurements in which an electrical current is passed via electrodes through an aqueous suspension consisting essentially of formation mineral colloidal particles/crude oil droplets, and determining the direction and speed of the colloidal movement. Zeta potential can be measured using electrochemical sensing technology using commercially available instruments.

In the methods described in the present disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

Method for Enhancing Oil Recovery

Provided in the present disclosure is a method for enhancing oil recovery from a carbonate reservoir or formation. The method is based on the injection of a low pH solution into a carbonate reservoir. The methods of the present disclosure can improve the potential of existing water flooding processes for higher oil recovery in carbonates. In some embodiments, the method alters the wettability at a surface of the formation. In some embodiments, the method includes: injecting a first slug containing low pH high salinity water into the reservoir, where the water has a pH of about 3 to about 5; and injecting a second slug containing chase water into the reservoir, where the chase water comprises high salinity brine. In some embodiments, the method includes recovering displaced oil from the carbonate reservoir. In some embodiments, injecting the low pH high salinity water into the reservoir renders the carbonate surface of the reservoir water-wet, thereby facilitating the removal of oil from the carbonate surface of the reservoir.

The methods of the present disclosure rely on wettability alteration, such as the interaction of surface charge changes induced across rock/brine and oil/brine interfaces. The methods involve reducing the pH of high salinity injection water, which subsequently results in favorable wettability alteration and higher oil recovery in carbonate reservoirs. In some embodiments, the pH is reduced by adding weak acid to the high salinity injection water. Thus, the methods of the present disclosure differ from other pH-based recovery methods that rely on injecting high pH alkaline solutions into the reservoir rather than low pH acidic solutions.

The methods of the present disclosure involve injecting a slug containing a low pH high salinity water into a reservoir. In some embodiments, the high salinity water is high salinity brine. In some embodiments, the high salinity water is a high salinity brine containing one or more ions selected from $Na^+$, $Cl^-$, $Ca^{2+}$, $Mg^{2+}$, $SO4^-$, $HCO_3^-$, and combinations thereof. The presence and concentration of each of the individual ions in the high salinity brine can be chosen based on, for example, the characteristics of the carbonate formation that is being treated.

In some embodiments, the high salinity brine contains $Na^+$. In some embodiments, the concentration of $Na^+$ is about 15,000 ppm to about 20,000 ppm, about 16,000 ppm to about 19,000 ppm, about 17,000 ppm to about 18,000 ppm, or about 15,000 ppm, about 15,500 ppm, about 16,000 ppm, about 16,500 ppm, about 17,000 ppm, about 17,500 ppm, about 18,000 ppm, about 18,300 ppm, about 18,500 ppm, about 19,000 ppm, about 19,500 ppm, or about 20,000 ppm. In some embodiments, the high salinity brine contains about 18,300 ppm $Na^+$.

In some embodiments, the high salinity brine contains $Cl^-$. In some embodiments, the concentration of $Cl^-$ is about 30,000 ppm to about 35,000 ppm, about 31,000 ppm to about 34,000 ppm, about 32,000 ppm to about 33,000 ppm, or about 30,000 ppm, about 30,500 ppm, about 31,000 ppm, about 31,500 ppm, about 32,000 ppm, about 32,200 ppm, about 32,500 ppm, about 33,000 ppm, about 33,500 ppm, about 34,000 ppm, about 34,500 ppm, or about 35,000 ppm. In some embodiments, the high salinity brine contains about 32,200 ppm $Cl^-$.

In some embodiments, the high salinity brine contains $Ca^{2+}$. In some embodiments, the concentration of $Ca^{2+}$ is about 500 ppm to about 1,000 ppm, about 600 ppm to about 900 ppm, about 700 ppm to about 800 ppm, or about 500 ppm, about 550 ppm, about 600 ppm, about 650 ppm, about 700 ppm, about 750 ppm, about 800 ppm, about 850 ppm, about 900 ppm, about 950 ppm, or about 1,000 ppm. In some embodiments, the high salinity brine contains about 650 ppm $Ca^{2+}$.

In some embodiments, the high salinity brine contains $Mg^{2+}$. In some embodiments, the concentration of $Mg^{2+}$ is about 1,000 ppm to about 5,000 ppm, about 2,000 ppm to about 4,000 ppm, about 2,000 ppm to about 3,000 ppm, or about 1,000 ppm, about 1,500 ppm, about 2,000 ppm, about 2,110 ppm, about 2,500 ppm, about 3,000 ppm, about 3,500 ppm, about 4,000 ppm, about 4,500 ppm, or about 5,000 ppm. In some embodiments, the high salinity brine contains about 2,110 ppm $Mg^{2+}$.

In some embodiments, the high salinity brine contains $SO4^{-2}$. In some embodiments, the concentration of $SO4^{-2}$ is about 2,000 ppm to about 7,000 ppm, about 3,000 ppm to about 6,000 ppm, about 4,000 ppm to about 5,000 ppm, or about 2,000 ppm, about 2,500 ppm, about 3,000 ppm, about 3,500 ppm, about 4,000 ppm, about 4,290 ppm, about 4,500 ppm, about 5,000 ppm, about 5,500 ppm, about 6,000 ppm, about 6,500 ppm, or about 7,000 ppm. In some embodiments, the high salinity brine contains about 4,290 ppm $SO4^{2-}$.

In some embodiments, the high salinity brine contains $HCO_3^-$. In some embodiments, the concentration of $HCO_3^-$ is about 50 ppm to about 500 ppm, about 100 ppm to about 400 ppm, about 200 ppm to about 300 ppm, or about 50 ppm, about 100 ppm, about 120 ppm, about 150 ppm, about 200 ppm, about 250 ppm, about 300 ppm, about 350 ppm, about 400 ppm, about 450 ppm, or about 500 ppm. In some embodiments, the high salinity brine contains about 120 ppm $HCO_3^-$.

In some embodiments, the high salinity water is a high salinity brine containing about 15,000 ppm to about 20,000 ppm $Na^+$, about 30,000 ppm to about 35,000 ppm $Cl^-$, about 500 ppm to about 1,000 ppm $Ca^{2+}$, about 1,000 ppm to about 5,000 ppm $Mg^{2+}$, about 2,000 ppm to about 7,000 ppm $SO4^{-2}$, and about 50 ppm to about 500 ppm $HCO_3^-$. In some embodiments, the high salinity water is a high salinity brine containing about 18,300 ppm $Na^+$, about 32,200 ppm $Cl^-$, about 650 ppm $Ca^{2+}$, about 2,110 ppm $Mg^{2+}$, about 4,290 ppm $SO4^{-2}$, and about 120 ppm $HCO_3^-$.

In some embodiments, the high salinity water has a total dissolved solids (TDS) content of about 35,000 ppm to about 60,000 ppm. For example, a TDS of about 35,000 ppm to about 60,000 ppm, about 35,000 ppm to about 57,500 ppm, about 35,000 ppm to about 55.00 ppm, about 35,000 ppm to about 50,000 ppm, about 35,000 ppm to about 45,000 ppm, about 35,000 ppm to about 40,000 ppm, about 40,000 ppm to about 60,000 ppm, about 40,000 ppm to about 57,500 ppm, about 40,000 ppm to about 55.00 ppm, about 40,000 ppm to about 50,000 ppm, about 40,000 ppm to about 45,000 ppm, about 45,000 ppm to about 60,000 ppm, about 45,000 ppm to about 57,500 ppm, about 45,000 ppm to about 55.00 ppm, about 45,000 ppm to about 50,000 ppm, about 50,000 ppm to about 60,000 ppm, about 50,000 ppm to about 57,500 ppm, about 50,000 ppm to about 55.00 ppm, about 55,000 ppm to about 60,000 ppm, about 55,000 ppm to about 57,500 ppm, about 57,500 ppm to about 60,000 ppm, or about 35,000 ppm, about 37,500 ppm, about 40,000 ppm, about 42,500 ppm, about 45,000 ppm, about 47,500 ppm, about 50,000 ppm, about 52,500 ppm, about 55,000 ppm, about 57,500 ppm, or about 60,000 ppm. In some embodiments, the high salinity water has a TDS of about 55,000 ppm to about 60,000 ppm. In some embodiments, the high salinity water has a TDS of about 57,000 ppm to about 58,000 ppm. In some embodiments, the high salinity water has a TDS of about 57,670 ppm. The amount of TDS in the high salinity water can be chosen based on, for example, the characteristics of the carbonate formation that is being treated.

In some embodiments, the pH of the high salinity water is between about 3 and about 5. For example, the pH of the water is about 3 to about 5, about 3 to about 4.5, about 3 to about 4, about 3 to about 3.5, about 3.5 to about 5, about 3.5 to about 4.5, about 3.5 to about 4, about 4 to about 5, about 4 to about 4.5, about 4.5 to about 5, or about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4.8, about 4.9, or about 5.0. In some embodiments, the pH is about 3.0.

The pH of the low pH high salinity water can be adjusted by adding a weak acid. Examples of suitable weak acids include, but are not limited to, acetic acid, formic acid, citric acid, benzoic acid, and phosphoric acid. In some embodiments, the weak acid is selected from acetic acid and citric acid. In some embodiments, the weak acid is acetic acid. In some embodiments, the weak acid is citric acid.

The methods of the present disclosure include injecting a slug containing low pH high salinity water into a carbonate reservoir. In some embodiments, the slug has a size of from 0.3 pore volumes (PV) to 0.5 PV, or 0.3 PV to 0.4 PV, or 0.4 PV to 0.5 PV, or 0.3 PV, 0.4 PV, or 0.5 PV. For example, the total amount of low pH high salinity water injected into the reservoir can be from 0.3 PV to 0.5 PV, or 0.3 PV to 0.4 PV, or 0.4 PV to 0.5 PV, or 0.3 PV, 0.4 PV, or 0.5.

In some embodiments of the method, the slug is injected once, with a slug size of 0.3 PV to 0.5 PV. In some embodiments, the slug is injected more than once, for example, two times, three times, or more. In some embodiments, the slug is injected twice, where the total amount of water injected is between 0.3 PV to 0.5 PV. For example, each slug size is 0.15 PV to 2.5 PV. In some embodiments, the slug is injected three times, where the total amount of water injected is between 0.3 PV to 0.5 PV. For example, each slug size is 0.1 PV to 0.17 PV. In some embodiments, the slug is pH tapered by successively increasing the pH value of each successive slug, such as by increasing the pH value from about 3 to about 5. For example, a 0.3 PV slug can contain first 0.1 PV at pH 3, followed by 0.1 PV at pH 4, and finally 0.1 PV at pH 5. Thus, in some embodiments, each successive slug contains low pH high salinity water with a higher pH value as compared to the previous slug.

In some embodiments, injection of the low pH high salinity water is favorable to alter wettability and release more oil from carbonate rock surface. In some embodiments, the low pH high salinity water alters the wettability by changing the surface charges at both the carbonate/brine and the oil/brine interfaces. For example, the low pH high salinity water can promote water-wet conditions, which would stabilize the water film on the rock surface. Such water-wet conditions are favorable to mobilize residual oil, which would have been otherwise trapped in the pores due to capillary forces. In some embodiments, the zeta potentials at the brine/rock and the oil/brine interfaces have the same charge polarities, resulting in electrostatic repulsion between the two interfaces. In some embodiments, the same charge polarity of zeta potentials at the brine/rock and oil/brine interfaces stabilizes the water film on the rock surface and promotes water-wet conditions. Thus, the described methods capitalize on the favorable effects of low pH conditions to increase oil recovery from waterflooding in carbonate reservoirs.

The methods of the present disclosure involve injecting a slug containing chase water into a reservoir. In some embodiments, the chase water is high salinity brine. In some embodiments, the chase water is a high salinity brine containing one or more ions selected from $Na^+$, $Cl^-$, $Ca^{2+}$, $Mg^{2+}$, $SO4^{-2}$, $HCO_3^-$, and combinations thereof. The presence and concentration of each of the individual ions in the high salinity brine can be chosen based on, for example, the characteristics of the carbonate formation that is being treated. In some embodiments, the high salinity brine of the low pH high salinity water is the same as the high salinity brine of the chase water. In some embodiments, the high salinity brine of the low pH high salinity water is different than the high salinity brine of the chase water.

In some embodiments, the slug containing the chase water is injected after injecting the slug containing the low pH high salinity water. In some embodiments, the slug containing the chase water is continuously injected into the reservoir at a continuous rate.

In some embodiments, the high salinity brine contains $Na^+$. In some embodiments, the concentration of $Na^+$ is about 15,000 ppm to about 20,000 ppm, about 16,000 ppm to about 19,000 ppm, about 17,000 ppm to about 18,000 ppm, or about 15,000 ppm, about 15,500 ppm, about 16,000 ppm, about 16,500 ppm, about 17,000 ppm, about 17,500 ppm, about 18,000 ppm, about 18,300 ppm, about 18,500 ppm, about 19,000 ppm, about 19,500 ppm, or about 20,000 ppm. In some embodiments, the high salinity brine contains about 18,300 ppm $Na^+$.

In some embodiments, the high salinity brine contains $Cl^-$. In some embodiments, the concentration of $Cl^-$ is about 30,000 ppm to about 35,000 ppm, about 31,000 ppm to about 34,000 ppm, about 32,000 ppm to about 33,000 ppm, or about 30,000 ppm, about 30,500 ppm, about 31,000 ppm, about 31,500 ppm, about 32,000 ppm, about 32,200 ppm, about 32,500 ppm, about 33,000 ppm, about 33,500 ppm, about 34,000 ppm, about 34,500 ppm, or about 35,000 ppm. In some embodiments, the high salinity brine contains about 32,200 ppm $Cl^-$.

In some embodiments, the high salinity brine contains $Ca^{2+}$. In some embodiments, the concentration of $Ca^{2+}$ is about 500 ppm to about 1,000 ppm, about 600 ppm to about 900 ppm, about 700 ppm to about 800 ppm, or about 500 ppm, about 550 ppm, about 600 ppm, about 650 ppm, about 700 ppm, about 750 ppm, about 800 ppm, about 850 ppm, about 900 ppm, about 950 ppm, or about 1,000 ppm. In some embodiments, the high salinity brine contains about 650 ppm $Ca^{2+}$.

In some embodiments, the high salinity brine contains $Mg^{2+}$. In some embodiments, the concentration of $Mg^{2+}$ is about 1,000 ppm to about 5,000 ppm, about 2,000 ppm to about 4,000 ppm, about 2,000 ppm to about 3,000 ppm, or about 1,000 ppm, about 1,500 ppm, about 2,000 ppm, about 2,110 ppm, about 2,500 ppm, about 3,000 ppm, about 3,500 ppm, about 4,000 ppm, about 4,500 ppm, or about 5,000 ppm. In some embodiments, the high salinity brine contains about 2,110 ppm $Mg^{2+}$.

In some embodiments, the high salinity brine contains $SO4^{-2}$. In some embodiments, the concentration of $SO4^{-2}$ is about 2,000 ppm to about 7,000 ppm, about 3,000 ppm to about 6,000 ppm, about 4,000 ppm to about 5,000 ppm, or about 2,000 ppm, about 2,500 ppm, about 3,000 ppm, about 3,500 ppm, about 4,000 ppm, about 4,290 ppm, about 4,500 ppm, about 5,000 ppm, about 5,500 ppm, about 6,000 ppm, about 6,500 ppm, or about 7,000 ppm. In some embodiments, the high salinity brine contains about 4,290 ppm $SO4^{2-}$.

In some embodiments, the high salinity brine contains $HCO_3^-$. In some embodiments, the concentration of $HCO_3^-$ is about 50 ppm to about 500 ppm, about 100 ppm to about 400 ppm, about 200 ppm to about 300 ppm, or about 50 ppm, about 100 ppm, about 120 ppm, about 150 ppm, about 200 ppm, about 250 ppm, about 300 ppm, about 350 ppm, about 400 ppm, about 450 ppm, or about 500 ppm. In some embodiments, the high salinity brine contains about 120 ppm $HCO_3^-$.

In some embodiments, the chase water is a high salinity brine containing about 15,000 ppm to about 20,000 ppm $Na^+$, about 30,000 ppm to about 35,000 ppm $Cl^-$, about 500 ppm to about 1,000 ppm $Ca^{2+}$, about 1,000 ppm to about 5,000 ppm $Mg^{2+}$, about 2,000 ppm to about 7,000 ppm $SO4^{-2}$, and about 50 ppm to about 500 ppm $HCO_3^-$. In some embodiments, the chase water is a high salinity brine containing about 18,300 ppm $Na^+$, about 32,200 ppm $Cl^-$, about 650 ppm $Ca^{2+}$, about 2,110 ppm $Mg^{2+}$, about 4,290 ppm $SO4^{-2}$, and about 120 ppm $HCO_3^-$.

In some embodiments, the chase water has a total dissolved solids (TDS) content of about 35,000 ppm to about 60,000 ppm. For example, a TDS of about 35,000 ppm to about 60,000 ppm, about 35,000 ppm to about 57,500 ppm, about 35,000 ppm to about 55.00 ppm, about 35,000 ppm to about 50,000 ppm, about 35,000 ppm to about 45,000 ppm, about 35,000 ppm to about 40,000 ppm, about 40,000 ppm to about 60,000 ppm, about 40,000 ppm to about 57,500 ppm, about 40,000 ppm to about 55.00 ppm, about 40,000 ppm to about 50,000 ppm, about 40,000 ppm to about 45,000 ppm, about 45,000 ppm to about 60,000 ppm, about 45,000 ppm to about 57,500 ppm, about 45,000 ppm to about 55.00 ppm, about 45,000 ppm to about 50,000 ppm, about 50,000 ppm to about 60,000 ppm, about 50,000 ppm to about 57,500 ppm, about 50,000 ppm to about 55.00 ppm, about 55,000 ppm to about 60,000 ppm, about 55,000 ppm to about 57,500 ppm, about 57,500 ppm to about 60,000 ppm, or about 35,000 ppm, about 37,500 ppm, about 40,000 ppm, about 42,500 ppm, about 45,000 ppm, about 47,500 ppm, about 50,000 ppm, about 52,500 ppm, about 55,000 ppm, about 57,500 ppm, or about 60,000 ppm. In some embodiments, the chase water has a TDS of about 55,000 ppm to about 60,000 ppm. In some embodiments, the chase water has a TDS of about 57,000 ppm to about 58,000 ppm. In some embodiments, the chase water has a TDS of about 57,670 ppm. The amount of TDS in the chase water can be chosen based on, for example, the characteristics of the carbonate formation that is being treated.

In some embodiments, the pH of the chase water is between about 6 and about 8. For example, the pH of the water is about 6 to about 8, about 6 to about 7.5, about 6 to about 7, about 6 to about 6.5, about 6.5 to about 8, about 6.5 to about 7.5, about 6.5 to about 7, about 7 to about 8, about 7 to about 7.5, about 7.5 to about 8, or about 6, about 6.1, about 6.2, about 6.3, about 6.4, about 6.5, about 6.7, about 6.8, about 6.9, about 7.0, about 7.1, about 7.2, about 7.3, about 7.4, about 7.45, about 7.5, about 7.6, about 7.7, about 7.8, about 7.9, or about 8.0. In some embodiments, the pH is about 7.45.

The methods of the present disclosure include injecting a slug containing low pH high salinity water into a carbonate reservoir. In some embodiments, the slug has a size of from 0.5 pore volumes (PV) to 1.0 PV, or 0.5 PV to 0.9 PV, 0.5 PV to 0.8 PV, 0.5 PV to 0.7 PV, 0.5 PV to 0.6 PV, 0.6 PV to 1.0 PV, 0.6 PV to 0.9 PV, 0.6 PV to 0.8 PV, 0.6 PV to 0.7 PV, 0.7 PV to 1.0 PV, 0.7 PV to 0.9 PV, 0.7 PV to 0.8 PV, 0.8 PV to 1.0 PV, 0.8 PV to 0.9 PV, or 0.9 PV to 1.0 PV, or 0.5 PV, 0.6 PV, 0.7 PV, 0.8 PV, 0.9 PV, or 1.0 PV. For example, the total amount of chase water injected into the reservoir can be from 0.5 PV to 1.0 PV, 0.5 PV to 0.9 PV, 0.5 PV to 0.8 PV, 0.5 PV to 0.7 PV, 0.5 PV to 0.6 PV, 0.6 PV to 1.0 PV, 0.6 PV to 0.9 PV, 0.6 PV to 0.8 PV, 0.6 PV to 0.7 PV, 0.7 PV to 1.0 PV, 0.7 PV to 0.9 PV, 0.7 PV to 0.8 PV, 0.8 PV to 1.0 PV, 0.8 PV to 0.9 PV, or 0.9 PV to 1.0 PV, or 0.5 PV, 0.6 PV, 0.7 PV, 0.8 PV, 0.9 PV, or 1.0 PV.

In some embodiments of the method, injecting the low pH high salinity water into the reservoir renders the carbonate surface of the reservoir water-wet, thereby facilitating the removal of oil from the carbonate surface of the reservoir. For example, injecting the low pH high salinity water into the reservoir renders the carbonate surface of the reservoir water-wet, thus loosening the oil from the surface of the carbonate. In some embodiments, injecting the chase water containing high salinity brine facilitates the removal of oil from the reservoir. Thus, in some embodiments, the method involves recovering displaced oil from the carbonate reservoir.

Also provided are methods of facilitating the removal of oil from a carbonate reservoir. In some embodiments, the method involves injecting a slug containing low pH high salinity water into the reservoir; injecting a slug containing chase water into the reservoir, where the chase water comprises high salinity brine; and displacing the oil from the carbonate surface of the reservoir. In some embodiments, the low pH high salinity water has a pH of about 3 to about 5. In some embodiments, the method comprises recovering the displaced oil from the reservoir.

Those of ordinary skill in the art will appreciate that the embodiments provided in the present disclosure can be applicable to different types of formations, including fractured formations and formations that are not fractured. For example, the embodiments described in the present disclosure can be applicable to carbonate formations, which typically display an oil-wet tendency due to the positive surface electrical charge on the carbonate mineral at reservoir conditions when pH is near neutral. Because of the oil-wet tendency, carbonate formations tend to have poor oil recovery due to the low mobility of the wetting phase. The embodiments provided in the present disclosure can, however, also apply to siliceous formations, for example, sandstone formations (such as sandstone formations including quartz minerals), or other formations. Thus, while the disclosure focuses on carbonate formations, the methods of the present disclosure are not limited to carbonate formations.

EXAMPLES

Example 1

Surface complexation models were run to determine zeta potential at carbonate/brine and oil/brine interfaces and to demonstrate the effect that lowering pH has on wettability alteration in carbonates. Zeta potential results obtained from the surface complexation model showed the favorable changes in surface charges at both the carbonate/brine and oil/brine interfaces to support the favorable wettability alteration aspects associated with low pH solutions.

FIG. 1 shows a nano thin-film water layer (about 0.1 nm to about 10 nm) sandwiched between a calcite surface and a crude oil surface. The thin-film water layer includes dissolved ions corresponding to a specific water-chemistry composition (for example, $OH^-$, $H^+$, $Cl^-$, and $Na^+$). Table 1 provides the composition of a high salinity brine that was tested and Table 2 summarizes the crude oil properties in terms of total acid number (TAN) and total base number (TBN). TBN signifies the basic components of crude oil, while TAN indicates acidic components in the oil. Both the acids and bases can adsorb at the oil-water interface and the relative proportions of these components determines the surface charge. For example, a crude oil with a high TAN can show a predominantly higher negative charge for oil-water interface, whereas an oil with high TBN may show either a relatively lower negative charge or positive charge for the oil-water interface.

TABLE 1

Composition of high salinity brine (HSB)

| Ion | Concentration (ppm) |
|---|---|
| $Na^+$ | 18,300 |
| $Cl^-$ | 32,200 |
| $Ca^{2+}$ | 650 |
| $Mg^{2+}$ | 2,110 |
| $SO_4^{-2}$ | 4,290 |
| $HCO_3^-$ | 120 |
| Total Dissolved Solids (TDS) | 57,670 |
| pH | 7.45 |

TABLE 2

Crude oil acid and base numbers

| Parameter | Value (mg KOH/g) |
|---|---|
| Total acid number (TAN) | 0.71 |
| Total base number (TBN) | 0.06 |

The surface complexation model (SCM) was used to describe the equilibrium state of ion adsorption based on specified surface reactions. For the calcite/brine/crude oil system shown in FIG. 1, pH was one of the key parameters that determined the adsorption of ions at crude oil/brine and calcite/brine interfaces, which ultimately affected the surface charges and the corresponding zeta potentials. The pH of the injection water was reduced by the addition of a weak acid such as citric acid or acetic acid. The affinity of the aqueous ions listed in Table 1 corresponding to different pH values were determined through surface chemistry reactions occurring at calcite and crude oil surfaces.

Figure 2:
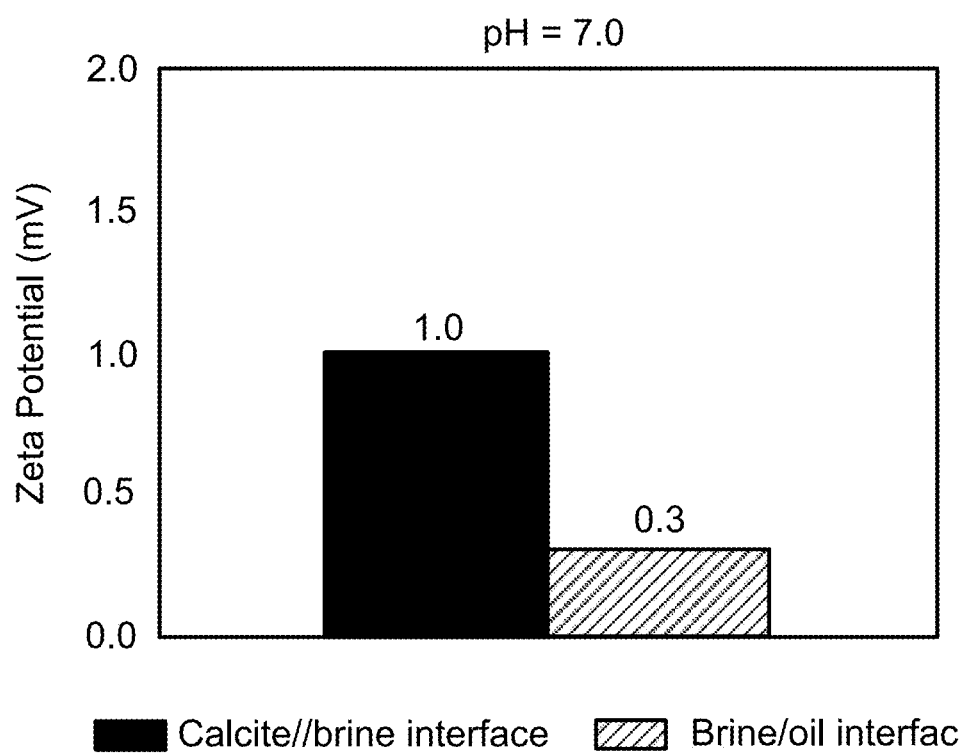
FIG. 2 shows the zeta potential values at the calcite/brine and oil/brine interfaces at pH 7.0.
Figure 3:
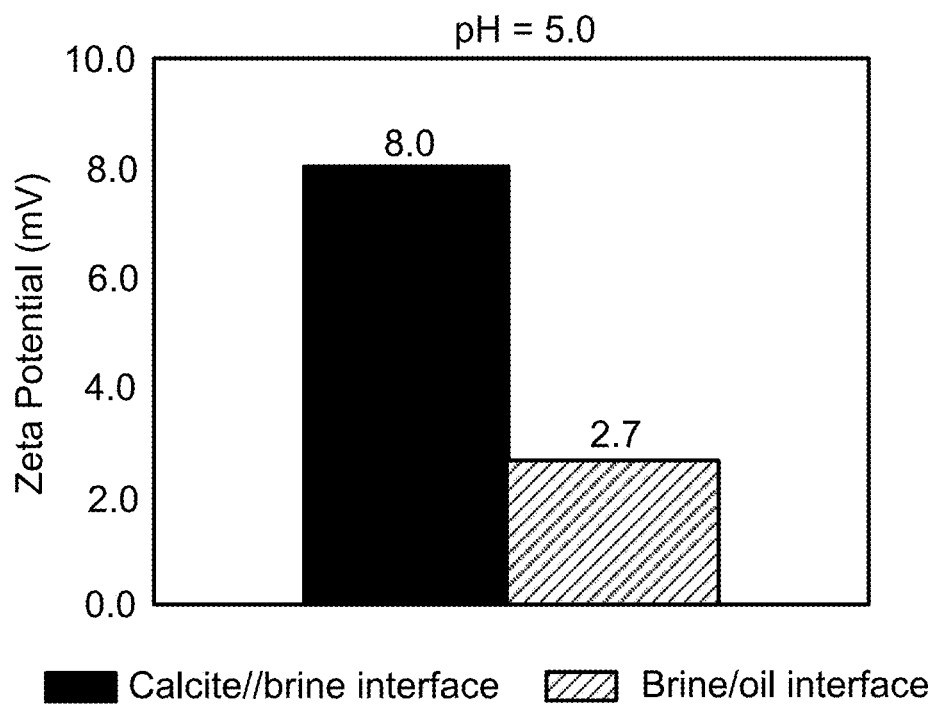
FIG. 3 shows the zeta potential values at the calcite/brine and oil/brine interfaces at pH 5.0.
Figure 4:
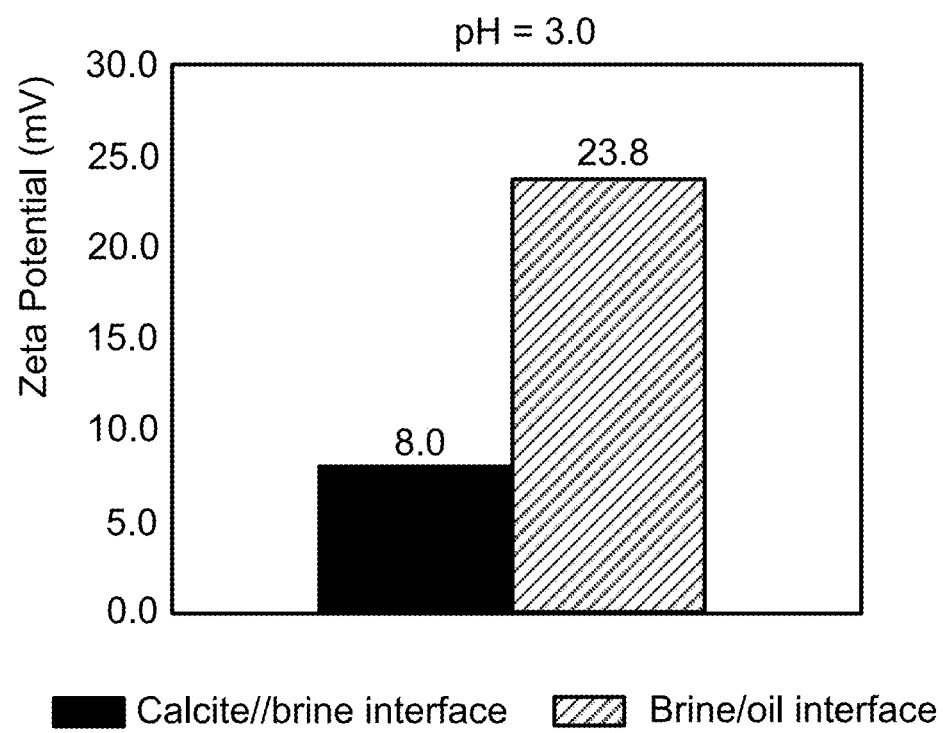
FIG. 4 shows the zeta potential values at the calcite/brine and oil/brine interfaces at pH 3.0.

FIGS. 2-4 show the SCM zeta potential values (mV) for both brine/calcite and crude-oil/brine as a function of brine pH. As shown in FIGS. 2-4, calcite/brine zeta potentials increased positively as the brine pH was lowered from 7 to 5 (from 1.0 mV at pH 7.0 to 8.0 mV at pH 3.0). At equilibrium, the pH level did not go below 5 due to calcite dissolution. The carbonate and calcium ions were dissolved in the brine, which maintained a minimum pH level of 5. The brine/oil zeta potential increased positively as the pH was lowered from 7 to 3, as shown in FIGS. 2-4. The brine/oil zeta potential increased to around 2.7 mV at around pH 5. At pH 3, the zeta potential became increasingly positive, as shown in FIG. 4 (23.8 mV).

These results indicated that reducing the pH of injection brines increased the positive charge at both the calcite/brine and oil/brine interfaces, which favorably altered the wettability towards the water-wet conditions for higher oil recovery.

Example 2

The injection sequence of different fluids into a carbonate reservoir to enhance oil recovery is as follows. First, a slug of high salinity water at a pH ranging from 3-5 is injected to allow favorable interactions on surface charges at both mineral/brine and oil/brine interfaces and subsequently alter wettability for releasing oil from the rock surface. The slug size can vary from 0.3 to 0.5 pore volumes (PV). The low pH conditions in the first slug can be achieved by the addition of any suitable weak acid such as citric acid or acetic acid to the high salinity injection water.

The first slug can also be pH tapered by successively increasing the pH value from 3 to 5. For example, a 0.3 PV slug can contain successively first 0.1 PV at pH=3 followed by 0.1 PV at pH=4 and ultimately the last 0.1 PV at pH=5.0.

Finally, a slug of high salinity brine as chase water is injected at slug sizes ranging from 0.5 to 1.0 pore volumes to push the mobilized oil and the formed oil bank towards producing wells. The salinity of injection brine can range from 35,000 ppm to 60,000 ppm TDS.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for enhancing oil recovery from a carbonate reservoir, comprising:
   injecting a first slug comprising low pH high salinity water comprising a weak acid into a carbonate reservoir, wherein the low pH high salinity water has a pH of about 3 to about 5; and
   injecting a second slug comprising chase water into the carbonate reservoir, wherein the chase water comprises high salinity brine.

2. The method of claim 1, wherein the low pH high salinity water comprises about 35,000 ppm to about 60,000 ppm total dissolved solids (TDS).

3. The method of claim 1, wherein the weak acid is selected from citric acid, formic acid, and acetic acid.

4. The method of claim 1, wherein the first slug has a slug size of from 0.3 pore volumes to 0.5 pore volumes.

5. The method of claim 4, wherein the first slug is injected one time, two times, three times, or more.

6. The method of claim 5, wherein the first slug is injected more than one time, wherein each injection comprises water with increasing pH value as compared to the previous injection.

7. The method of claim 1, wherein the high salinity brine comprises about 35,000 ppm to about 60,000 ppm total dissolved solids (TDS).

8. The method of claim 1, wherein the high salinity brine has a pH of from about 6 to about 8.

9. The method of claim 1, wherein the second slug has a slug size of from 0.5 pore volumes to 1.0 pore volumes.

10. The method of claim 1, wherein injecting the second slug into the carbonate reservoir comprises continuously injecting the second slug at a continuous rate.

11. The method of claim 1, wherein the chase water is injected after the low pH high salinity water is injected.

12. The method of claim 1, comprising recovering displaced oil from the carbonate reservoir.

13. The method of claim 1, wherein injecting the low pH high salinity water into the reservoir renders a surface of the reservoir water wet, thereby facilitating removal of oil from the surface of the reservoir.

14. A method of facilitating the removal of oil from a carbonate reservoir, comprising:
   injecting a first slug comprising low pH high salinity water comprising a weak acid into a carbonate reservoir, wherein the low pH high salinity water has a pH of about 3 to about 5;
   injecting a second slug comprising chase water into the carbonate reservoir, wherein the chase water comprises high salinity brine; and
   displacing oil from a surface of the carbonate reservoir.

15. The method of claim 14, wherein the method comprises recovering the displaced oil from the carbonate reservoir.

16. The method of claim 14, wherein the low pH high salinity water comprises about 35,000 ppm to about 60,000 ppm total dissolved solids (TDS).

17. The method of claim 14, wherein the first slug has a slug size of from 0.3 pore volumes to 0.5 pore volumes.

18. The method of claim 14, wherein the high salinity brine comprises about 35,000 ppm to about 60,000 ppm total dissolved solids (TDS).

19. The method of claim 14, wherein the high salinity brine has a pH of from about 6 to about 8.

20. The method of claim 14, wherein the second slug has a slug size of from 0.5 pore volumes to 1.0 pore volumes.

21. The method of claim 14, wherein the chase water is injected after the low pH high salinity water is injected.

* * * * *